(12) United States Patent
Striewe et al.

(10) Patent No.: US 10,230,233 B2
(45) Date of Patent: Mar. 12, 2019

(54) OVERVOLTAGE PROTECTION DEVICE WITH LEAKAGE CURRENT CUT-OFF

(71) Applicant: PHOENIX CONTACT GMBH & CO. KG, Blomberg (DE)

(72) Inventors: Martin Striewe, Horn-Bad Meinberg (DE); Joachim Wosgien, Loehe (DE)

(73) Assignee: PHOENIX CONTACT GMBH & CO. KG (DE)

( * ) Notice: Subject to any disclaimer, the term of this patent is extended or adjusted under 35 U.S.C. 154(b) by 152 days.

(21) Appl. No.: 15/117,278

(22) PCT Filed: Jan. 20, 2015

(86) PCT No.: PCT/EP2015/050924
§ 371 (c)(1),
(2) Date: Aug. 8, 2016

(87) PCT Pub. No.: WO2015/121027
PCT Pub. Date: Aug. 20, 2015

(65) Prior Publication Data
US 2016/0352093 A1 Dec. 1, 2016

(30) Foreign Application Priority Data
Feb. 17, 2014 (DE) .................. 10 2014 202 880

(51) Int. Cl.
*H02H 9/02* (2006.01)
*H02H 3/20* (2006.01)
(Continued)

(52) U.S. Cl.
CPC .............. *H02H 3/20* (2013.01); *H02H 9/042* (2013.01); *H02H 9/043* (2013.01); *H01C 7/12* (2013.01);
(Continued)

(58) Field of Classification Search
USPC ................... 361/103, 104, 106, 117–120
See application file for complete search history.

(56) References Cited

U.S. PATENT DOCUMENTS

| 6,226,162 | B1 * | 5/2001 | Kladar | ..... H02H 3/44 361/111 |
| 2008/0088405 | A1 * | 4/2008 | Xu | ..... H01C 7/10 338/21 |

(Continued)

FOREIGN PATENT DOCUMENTS

| DE | 3915198 | 11/1990 |
| DE | 41 24 321 A1 | 1/1993 |

(Continued)

OTHER PUBLICATIONS

International Search Report prepared by the European Patent Office dated Feb. 16, 2015, for International Application No. PCT/EP2015/050924.

*Primary Examiner* — Danny Nguyen
(74) *Attorney, Agent, or Firm* — Sheridan Ross P.C.

(57) ABSTRACT

The invention relates to an overvoltage protection device with leakage current cutoff, having a parallel connection of a first current branch and a second current branch, wherein the first current branch comprises a switching element and a first non-linear resistor element, and the second current branch comprises a securing element with signaling properties and a second non-linear resistor element and a complex resistor. Dependent on a state modification of the securing element with signaling properties, said switching element is switched.

8 Claims, 1 Drawing Sheet

(51) Int. Cl.
*H02H 9/04* (2006.01)
*H01H 37/76* (2006.01)
*H01C 7/12* (2006.01)
*H02H 5/04* (2006.01)

(52) U.S. Cl.
CPC ............ *H01H 37/761* (2013.01); *H02H 5/04* (2013.01); *H02H 9/02* (2013.01)

(56) References Cited

U.S. PATENT DOCUMENTS

| | | | | |
|---|---|---|---|---|
| 2011/0267732 | A1* | 11/2011 | Kuo | H02H 9/042 361/104 |
| 2015/0009596 | A1* | 1/2015 | Lagnoux | H02H 9/005 361/56 |

FOREIGN PATENT DOCUMENTS

| | | |
|---|---|---|
| DE | 101 16 172 A1 | 10/2002 |
| DE | 102 11 795 A1 | 7/2003 |
| EP | 1 826 780 A1 | 8/2007 |
| KR | 1020120087584 | 8/2012 |

* cited by examiner

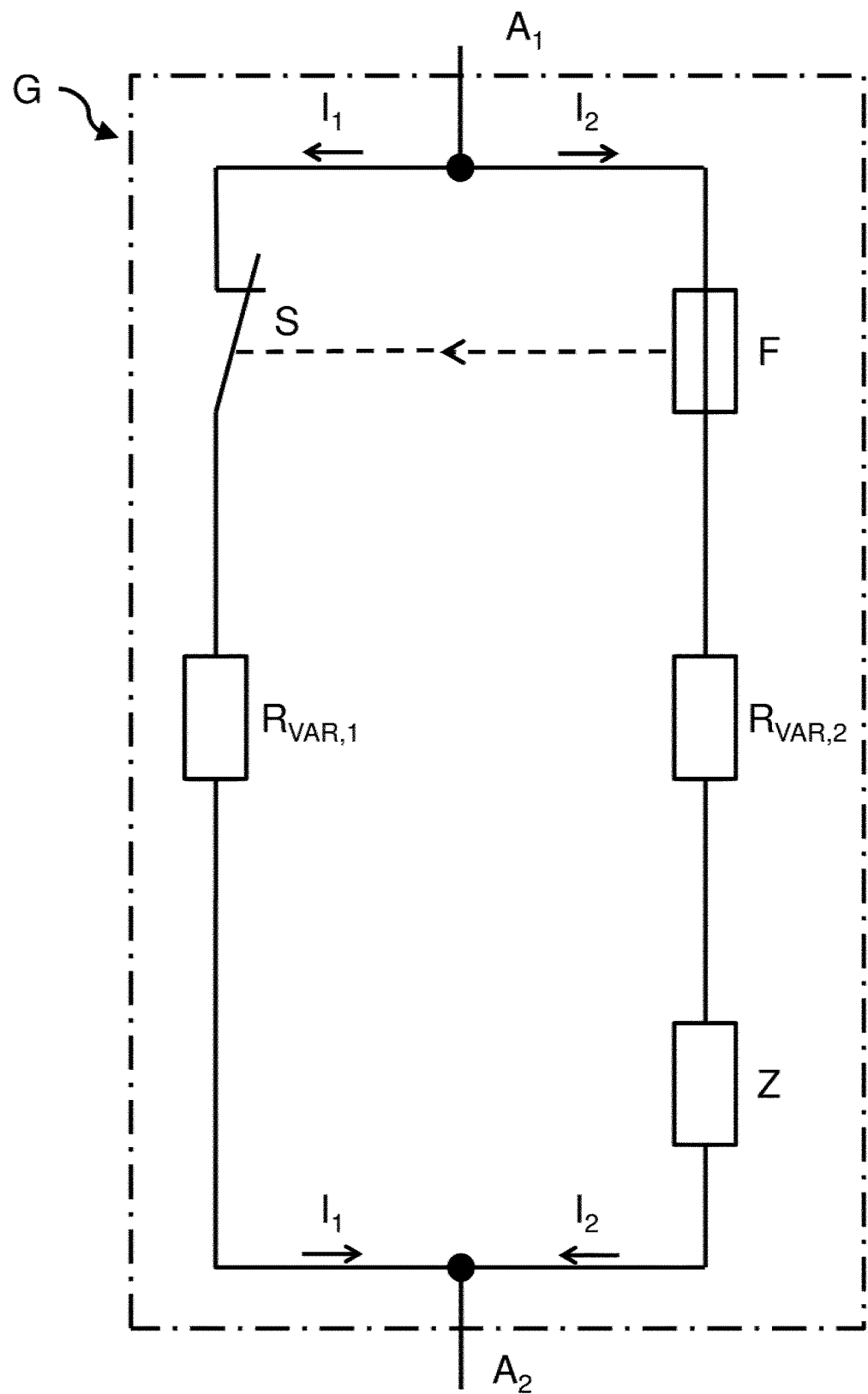

OVERVOLTAGE PROTECTION DEVICE WITH LEAKAGE CURRENT CUT-OFF

CROSS REFERENCE TO RELATED APPLICATIONS

This application is a national stage application under 35 U.S.C. 371 and claims the benefit of PCT Application No. PCT/EP2015/050924 having an international filing date of 20 Jan. 2015, which designated the United States, which PCT application claimed the benefit of German Patent Application No. 10 2014 202 880.9 filed 17 Feb. 2014, the disclosure of each of which are incorporated herein by reference.

The invention relates to an overvoltage protection device with leakage current cut-off.

Overvoltage protection devices of the widest variety of types have undesired leakage currents as a result of aging and/or operation outside of the specified operating voltages.

These leakage currents lead to higher energy costs for one thing, and for another, these leakage currents also lead to heating of the overvoltage protection device in question. This heating can be so extensive that it can result in further damage to or destruction of the overvoltage protection device itself and of surrounding components and even trigger fires.

To address these negative effects, various arrangements have been proposed in the past with which such a malfunctioning overvoltage protection device was to be disconnected from the supply network in order to prevent unacceptable heating or destruction of the overvoltage protection device.

One example of a known measure is the provision of a heat-meltable connection, e.g., of a solder joint that breaks a connection to the overvoltage protection device when the melting temperature is reached.

Other measures make provisions for the use of parallel circuits, with the leakage current being conducted over a path containing at least one parasitic inductance, whereas an overvoltage event is conducted through a gas-filled surge discharger parallel thereto.

Although these measures can be used successfully, they are not able to cover the entire spectrum of overvoltage protection devices and the uses thereof.

Particularly for direct-current networks, also referred to as DC networks, such as those found in solar systems, for example, and in very high-output alternating-current networks, also referred to as AC networks, the ability to disconnect represents a major hurdle.

While suitable separating elements (e.g., fuses) still do exist for low DC currents (i.e., rated currents of the fuse) that are capable of interrupting the flow of current, even in case of a high prospective short-circuit current in the current branch, the expense involved in achieving such a switch-off capacity rises sharply with higher currents (rated currents of the fuse). Along with the technical challenges, this expense is also a cost driver, making the corresponding trip device very expensive on the whole.

At the same time, a fuse that is arranged in series to a surge discharger must be capable of bearing the (pulse) current that is flowing through the surge discharger during normal operation.

It is the object of the invention to provide an overvoltage protection device with leakage current cut-off that provides reliable interruption even for high currents and DC networks.

This object is achieved by an overvoltage protection device with leakage current cut-off having a parallel circuit of a first current branch and of a second current branch, with the first current branch having a switch element and a first nonlinear resistive element, and with the second current branch having a fuse element with signaling characteristic and a second nonlinear resistive element as well as a complex resistor, with the switch element being caused to switch as a function of a state change of the fuse element with signaling characteristic.

Advantageous developments are also the subject of the dependent claims.

In the following, the invention is explained in further detail with reference to the enclosed drawing on the basis of preferred embodiments.

FIG. 1 shows an exemplary schematic representation of embodiments of the invention.

FIG. 1 shows an exemplary schematic representation of embodiments of the overvoltage protection device with leakage current cut-off. It comprises a parallel circuit of a first current branch $I_1$ and of a second current branch $I_2$.

The first current branch $I_1$, comprises a switch element S and a first nonlinear resistive element $R_{var,1}$. The second current branch $I_2$ comprises a fuse element with signaling characteristic F and a second nonlinear resistive element $R_{var,2}$ as well as a complex resistor Z.

The switch element S and the fuse element with signaling characteristic F are caused to cooperate with one another such that the switch element S is caused to switch as a function of a state change of the fuse element with signaling characteristic F.

In this way, as will be explained below, reliable shutoff can be ensured.

In the first current branch $I_1$ of the overvoltage protection device, there is a resistive element $R_{var,1}$ with a nonlinear current/voltage characteristic that is dimensioned with respect to its discharge capacity such that it can substantially bear the required discharge capacity of the arrangement. Arranged in series hereto is a switch element S which, in terms of its surge current load rating, corresponds substantially to the discharge capacity $R_{var,1}$. However, the (DC) breaking capacity of the switch element S needs only to be low, thus enabling cost-effective and simple switch elements to be used.

In the second current branch $I_2$, there is also a resistive element $R_{var,2}$ with a nonlinear current/voltage characteristic that can be dimensioned with respect to its discharge capacity such that it is only able to bear a partial current $I_2$ that is substantially smaller than the discharge current of the first current branch $I_1$.

With respect to their voltage ratings (e.g., Uv, voltage drop in an applied current of 1 mA), $R_{var,1}$ and $R_{var,2}$ are substantially equal, and in the case of a different design, at least $R_{var,2}$ can have a slightly lower characteristic voltage (e.g., varistor voltage) with the same applied current.

The lower discharge voltage load capacity of $R_{var,2}$ compared to $R_{var,1}$ manifests itself with regard to the current/voltage characteristic of $R_{var,2}$ as a greater steepness in comparison to the current/voltage characteristic of $R_{var,1}$.

A fuse element with signaling characteristic F, for example a fuse with indicator, that can be designed with respect to its surge current load rating for the partial current $I_2$ flowing over the second current branch $I_2$ in the event of a discharge, which is substantially smaller than the surge current fraction of the first current branch $I_1$, is in series with $R_{var,2}$ in the second current branch $I_2$.

Another element that is located in the second current branch $I_2$ is the complex resistor Z, which is formed either from parasitic or concrete elements.

The steeper characteristic curve of $R_{var,2}$ in comparison to $R_{var,1}$ in conjunction with Z has the effect that, in the event of a discharge, the main portion of the discharge current flows through the first current branch $I_1$, whereas a substantially smaller portion flows through the second current branch $I_2$, which does not activate the fuse element with signaling characteristic F.

If a voltage is applied to the overall arrangement via the terminals $A_1$, $A_2$ which leads to a (leakage) current flow through the first current branch $I_1$ and the second current branch $I_2$, then a greater portion of current will flow through the second current branch $I_2$ than in the discharge case, since the characteristic curve of $R_{var,2}$ is relatively flat in the lower (leakage) current range. This flow of current causes $R_{var,2}$ to fuse, which causes its impedance to break down and allows the flow of current in the second current branch $I_2$ to rise substantially farther.

The flow of current through the second current branch $I_2$ activates the fuse element with signaling characteristic F. The fuse element with signaling characteristic F interrupts the flow of current in the second current branch $I_2$ through its switch-off capacity. The indicator of the fuse element with signaling characteristic F triggers the actuation of the switch element S, which then also interrupts the flow of current in the first current branch $I_1$.

The actuation can be achieved directly through a mechanical effect, for example, or lead indirectly to an actuation. For example, a provision can be made that an energy store for actuating the switch element S is released.

In one exemplary arrangement, which solely serves to illustrate the invention, the first nonlinear resistive element $R_{var,1}$ is a varistor, for example, with an overall size of 80 mm, having the following performance data $V_{rms}$=320 V, $V_{DC}$=420 V, $i_{max,\,8.20\,\mu s}$=100000 A, $W_{max,\,2\,ms}$=1600 J, $P_{max}$=2 W, $V_{v,1\,mA}$=510 V, while the second nonlinear resistive element $R_{var,2}$ is a varistor with an overall size of 14 mm, for example, with the following performance data $V_{rms}$=320 V, $V_{DC}$=420 V, $i_{max,\,8.20\,\mu s}$=4500 A, $W_{max,\,2\,ms}$=84 J, $P_{max}$=0.6 W, $V_{v,1\,mA}$=510 V.

If a (test) voltage of 600 V is applied to this parallel circuit to simulate a leakage current, then the second nonlinear resistive element $R_{var,2}$ would already have absorbed about 84 J of energy after about 1.2 s, so the quick fusing of the second nonlinear resistive element $R_{var,2}$ would have to be expected, whereas the first nonlinear resistive element $R_{var,1}$ would already have absorbed about 968 J after about 1.2 s and would therefore still be stable.

By means of the general solution described above, it is thus possible to provide simple and cost-effective overvoltage protection device with leakage current cut-off that provides reliable interruption even for high currents and DC networks.

In an advantageous embodiment of the invention, the first nonlinear resistive element $R_{var,1}$ and the second nonlinear resistive element $R_{var,2}$ each comprising a nonlinear current/voltage characteristic, with the steepness of the characteristic of the second nonlinear resistive element $R_{var,2}$ being greater than the steepness of the characteristic of the first nonlinear resistive element $R_{var,1}$.

The switching behavior of the two current branches can thus be set with a very high level of precision and, what is more, optimization can be performed with respect to manufacturing costs.

In yet another embodiment, the first nonlinear resistive element $R_{var,1}$ and/or the second nonlinear resistive element $R_{var,2}$ comprises a varistor.

In this way, the good voltage-limiting characteristics of varistors can be utilized. In addition, cost-effective standard components can be used.

In yet another embodiment, the fuse element with signaling characteristic F is a trip indicator fuse.

In this way, the good separating characteristics of trip indicator fuses can be utilized. In addition, cost-effective standard components can be used.

In yet another embodiment, the surge current load capacity of the first current branch $I_1$ is greater than the surge current load capacity of the second current branch $I_2$. Here, too, the costs of a device according to the invention can be optimized without compromising in terms of switching capacity.

In yet another embodiment, the complex resistor Z is made available by one or more specific components. Examples of specific components are resistors, coils and capacitors.

In this way, the second current branch is protected in the manner of a filter from a rather high-frequency impulse current event resulting from an overvoltage event, which can be reliably discharged via the first current branch.

In one advantageous embodiment, the overvoltage protection device with leakage current cut-off according to the invention is arranged in a housing G—represented in FIG. 1 by a dot-and-dash frame—with corresponding terminals $A_1$ and $A_2$. This enables especially easy installation of prefabricated overvoltage protection devices with leakage current cut-off.

LIST OF REFERENCE SYMBOLS

First current branch $I_1$
Second current branch $I_2$
Switch element S
Nonlinear resistive element $R_{var,1}$; $R_{var,2}$
Complex resistor Z
Housing G
Fuse element with signaling characteristic F
Terminals $A_1$, $A_2$

The invention claimed is:

1. An overvoltage protection device with leakage current cut-off, comprising:
   a parallel circuit of a first current branch and of a second current branch, wherein the first current branch comprises a switch element and a first nonlinear resistive element, and wherein the second current branch comprises a fuse element with a signaling characteristic and a second nonlinear resistive element as well as a complex resistor, with the switch element being caused to switch as a function of a state change of the fuse element with the signaling characteristic.

2. An overvoltage protection device with leakage current cut-off, comprising:
   a parallel circuit of a first current branch and of a second current branch, wherein the first current branch comprises a switch element and a first nonlinear resistive element, and wherein the second current branch comprises a fuse element with a signaling characteristic and a second nonlinear resistive element as well as a complex resistor, with the switch element being caused to switch as a function of a state change of the fuse element with the signaling characteristic, wherein the first nonlinear resistive element and the second nonlinear resistive element each comprise a nonlinear current/voltage characteristic, with the steepness of the characteristic of the second nonlinear resistive element being greater than the steepness of the characteristic of the first nonlinear resistive element.

3. The overvoltage protection device as set forth in claim 2, wherein the first nonlinear resistive element and/or the second nonlinear resistive element has a varistor.

4. The overvoltage protection device as set forth in claim 1, wherein the fuse element with the signaling characteristic (F) is a trip indicator fuse.

5. An overvoltage protection device with leakage current cut-off, comprising:
a parallel circuit of a first current branch and of a second current branch, wherein the first current branch comprises a switch element and a first nonlinear resistive element, and wherein the second current branch comprises a fuse element with a signaling characteristic and a second nonlinear resistive element as well as a complex resistor, with the switch element being caused to switch as a function of a state change of the fuse element with the signaling characteristic, wherein the surge current load capacity of the first current branch is greater than the surge current load capacity of the second current branch.

6. The overvoltage protection device as set forth in claim 1, wherein the complex resistor is made available by one or more specific components.

7. The overvoltage protection device as set forth in claim 1, wherein characteristics of the first and second nonlinear resistive elements are such that, in the event of a discharge, the first current branch carries a main portion of the discharge current and the second current branch carries a smaller portion of the discharge current.

8. The overvoltage protection device as set forth in claim 7, wherein the characteristics of the first and second nonlinear resistive elements are such that, in the event of a leakage current, the second current branch carries a greater portion of the leakage current than the first current branch such that the second nonlinear resistive element fuses to trigger the fuse element and cause the switch element to switch.

* * * * *